United States Patent [19]

Pickett et al.

[11] Patent Number: 5,451,763
[45] Date of Patent: Sep. 19, 1995

[54] PERSONAL MEDICAL IC CARD AND READ/WRITE UNIT

[75] Inventors: David R. Pickett, Plano, Tex.; Richard M. Altobellis, Boulder, Colo.

[73] Assignee: Alto Corporation, Boulder, Colo.

[21] Appl. No.: 270,389

[22] Filed: Jul. 5, 1994

[51] Int. Cl.$^6$ .............................................. G06K 19/06
[52] U.S. Cl. .................................. 235/492; 235/487; 235/488; 235/451
[58] Field of Search ................ 235/487, 488, 492, 451

[56] References Cited

U.S. PATENT DOCUMENTS

| | | | |
|---|---|---|---|
| 4,211,919 | 7/1980 | Ugon | 235/487 |
| 4,417,413 | 11/1983 | Hoppe et al. | 40/630 |
| 4,463,971 | 8/1984 | Hoppe et al. | 283/83 |
| 4,501,960 | 2/1985 | Jouvet et al. | 235/492 |
| 4,539,472 | 9/1985 | Poetker et al. | 235/488 |
| 4,572,946 | 2/1986 | Schrenk | 235/380 |
| 4,575,621 | 3/1986 | Dreifus | 235/380 |
| 4,605,844 | 8/1986 | Haggan | 235/380 |
| 4,611,262 | 9/1986 | Galloway et al. | 361/421 |
| 4,634,847 | 1/1987 | Jurgen | 235/451 |
| 4,683,372 | 7/1987 | Matsumoto | 235/492 |
| 4,707,594 | 11/1987 | Roth | 235/488 |
| 4,714,980 | 12/1987 | Hara | 361/395 |
| 4,719,140 | 1/1988 | Hara et al. | 428/138 |
| 4,720,626 | 1/1988 | Nishikawa et al. | 235/449 |
| 4,727,246 | 2/1988 | Hara et al. | 235/488 |
| 4,733,061 | 3/1988 | Hegi | 235/492 |
| 4,755,660 | 7/1988 | Nakano | 235/380 |
| 4,758,718 | 7/1988 | Fujisaki et al. | 235/487 |
| 4,763,340 | 8/1988 | Yoneda et al. | 375/121 |
| 4,766,294 | 8/1988 | Nara et al. | 235/380 |
| 4,777,355 | 10/1988 | Takahira | 235/380 |
| 4,795,898 | 1/1989 | Bernstein et al. | 235/487 |
| 4,797,542 | 1/1989 | Hara | 235/380 |
| 4,797,543 | 1/1989 | Watanabe | 235/492 |
| 4,798,941 | 1/1989 | Watanabe | 235/380 |
| 4,806,745 | 2/1989 | Oogita | 235/492 |
| 4,812,634 | 3/1989 | Ohta et al. | 235/492 |
| 4,818,853 | 4/1989 | Ohta et al. | 235/492 |
| 4,827,111 | 5/1989 | Kondo | 235/380 |
| 4,835,373 | 5/1989 | Adams et al. | 235/451 |
| 4,845,351 | 7/1989 | Hara et al. | 235/492 |
| 4,851,654 | 7/1989 | Nitta | 235/492 |

(List continued on next page.)

*Primary Examiner*—Harold Pitts
*Attorney, Agent, or Firm*—Gregory M. Howison; Joe E. Shalllenburger

[57] ABSTRACT

Reading data from, writing data to and storing data in an IC card, utilizing an external Read/Write unit. An IC card (12) is provided. The IC card (12) comprises a rigid substrate (86) and electrical components (88) disposed on the substrate. A card coil (32) is provided about the periphery of the substrate (86) and is placed in a coil form (94). Card capacitive plates (24) and (26) are disposed on the bottom of the substrate (86). Power circuitry is provided for receiving inductive power from the card coil (32) and generating a regulated power supply voltage for powering the electrical components (88). I/O circuitry is provided for capacitively coupling data via the card capacitor plates (24) and (26). A cover (130) is also provided for covering the electric components (88) on the substrate (86). An IC card Read/Write unit (14) is provided. The IC card Read/Write unit comprises a receptacle (16) shaped similar to the substrate (86) of the IC card (12). A Read/Write unit coil (36) is provided disposed on the lateral sides of the receptacle (16), such that the Read/Write unit coil (36) is proximate to the card coil (32) when the card (12) is disposed within the receptacle (16). Driving circuitry is also provided for driving the Read/Write unit coil (36) to provide inductive power to the card (12). Read/Write unit capacitor plates (36) and (38) are provided and disposed such that when the card (12) is disposed within the receptacle (16), the card capacitor plates (24) and (26) are proximate to the Read/Write unit capacitor plates (36) and (38). Read/Write circuitry is also provided for capacitively coupling data via the Read/Write unit capacitor plates (36) and (38). The IC card (12) may be programmed for data protocols and access codes so that different data protocols may be used to input data and the data may be protected using a personal identification number (PIN).

29 Claims, 9 Drawing Sheets

U.S. PATENT DOCUMENTS

| | | | |
|---|---|---|---|
| 4,853,523 | 8/1989 | Talmadge | 235/492 |
| 4,868,373 | 9/1989 | Opheij et al. | 235/380 |
| 4,916,296 | 4/1990 | Streck | 235/454 |
| 4,942,534 | 7/1990 | Yokoyama et al. | 364/468 |
| 4,960,983 | 10/1990 | Inoue | 235/449 |
| 4,962,485 | 10/1990 | Kato et al. | 365/229 |
| 5,068,521 | 11/1991 | Yamaguchi | 235/492 |
| 5,113,184 | 5/1992 | Katayama | 340/825.54 |
| 5,175,418 | 12/1992 | Tanaka | 235/439 |
| 5,182,442 | 1/1993 | Takahira | 235/492 |
| 5,196,682 | 3/1993 | Engelhardt | 235/454 |
| 5,202,838 | 4/1993 | Inoue | 364/480 |
| 5,220,158 | 6/1993 | Takahira et al. | 235/492 |
| 5,399,847 | 3/1995 | Droz | 235/492 |

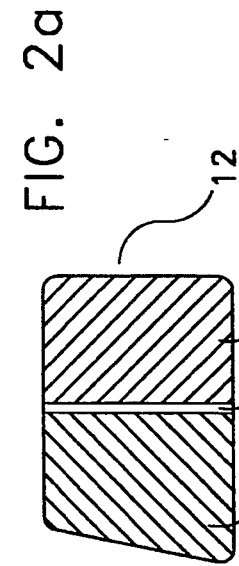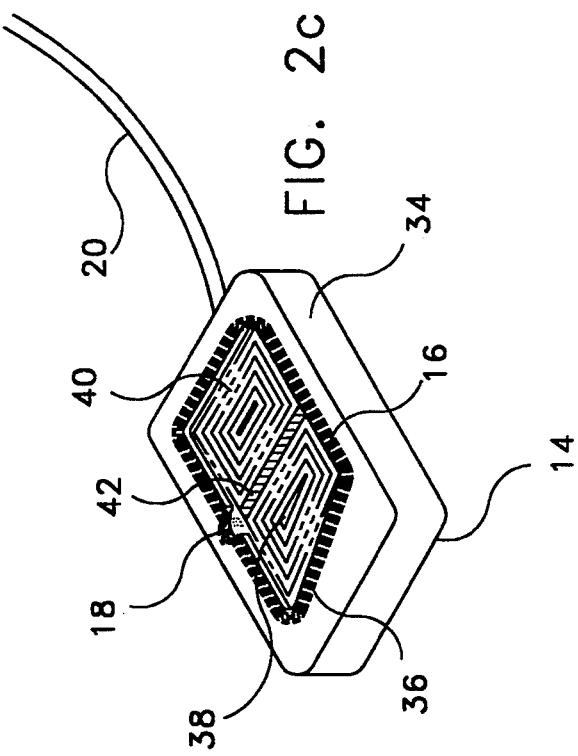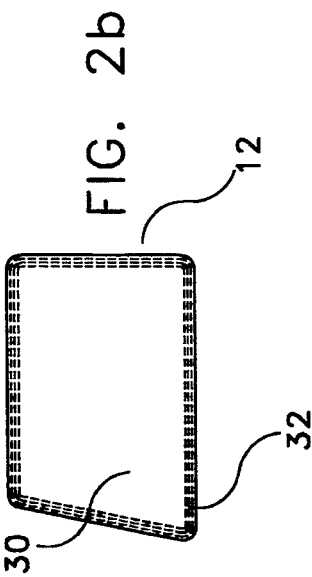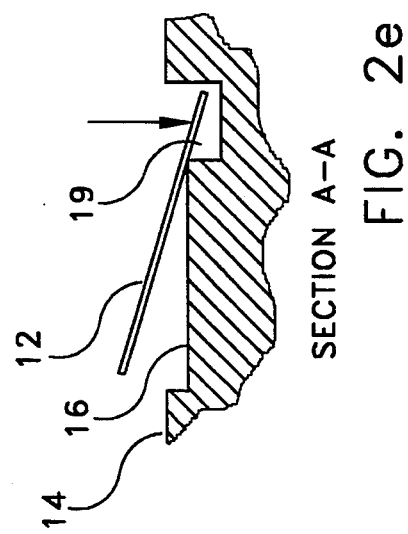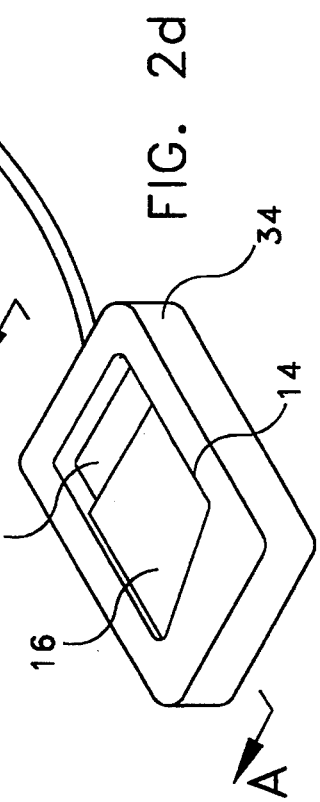

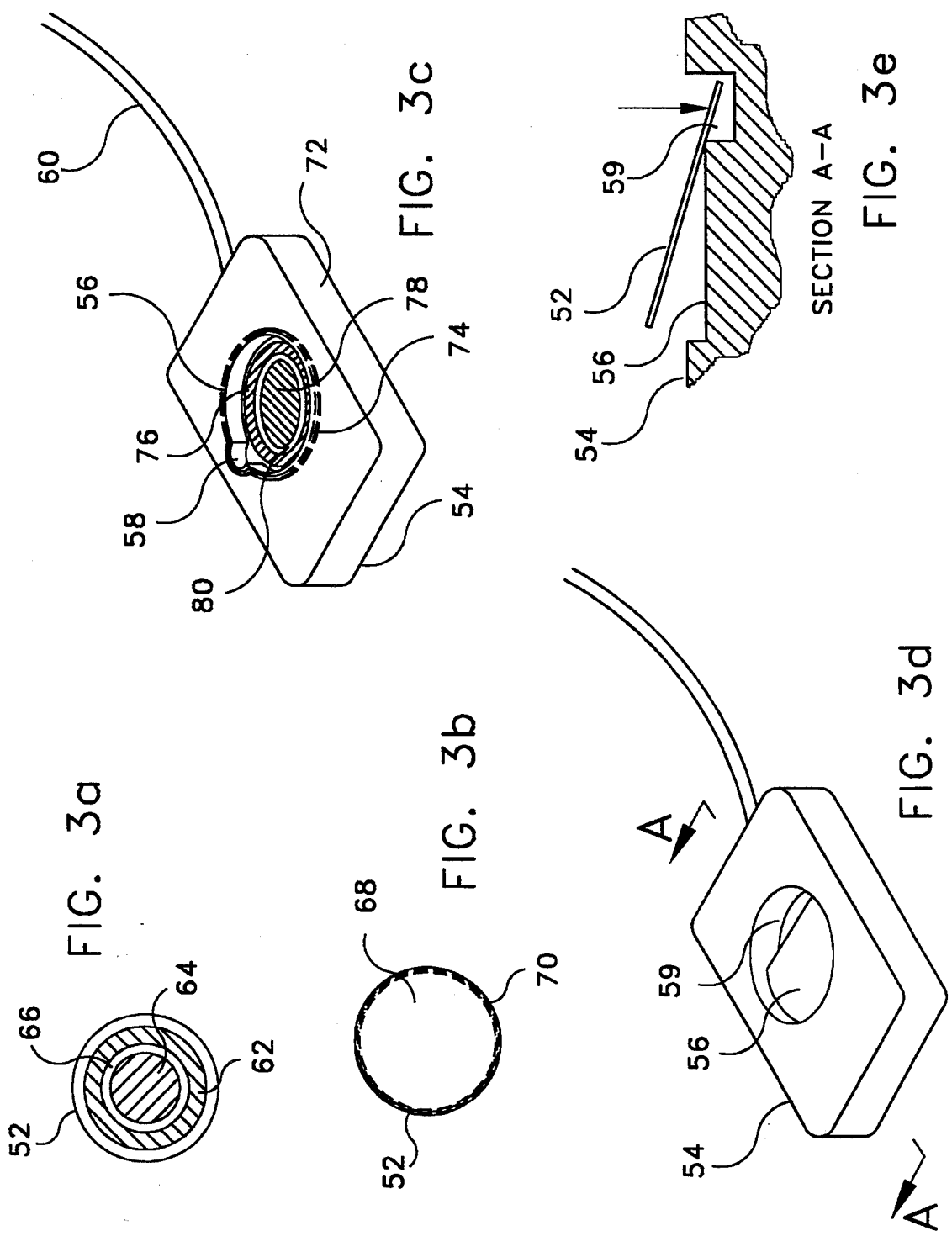

PERSONAL MEDICAL IC CARD AND READ/WRITE UNIT

TECHNICAL FIELD OF THE INVENTION

The present invention pertains in general to an IC card and Read/Write unit and more particularly, relates to an IC card having a capacitive coupling device for coupling data and other signals in and out of the IC card and supplying power to the IC card through electromagnetic coupling.

BACKGROUND OF THE INVENTION

The development and use of intelligent credit cards, "smart cards" or "IC cards" is well-known. These devices are made by encasing one or more microelectronic chips in a plastic carrier the size of a credit card. The card generally includes a non-volatile memory for the storage of primary encoded data, and some cards include a CPU chip for limited processing of that data.

With the advent of recent advances in microelectronics, it is now possible to put a vast amount of computing power and memory right in the IC card. The card could, therefore, carry personal identification data to virtually eliminate fraudulent use, such data as personal characteristics, driver's license, social security number, personal identification numbers, and even a voice print. The card could also carry the account numbers of all the owner's charge accounts, the balances of all accounts, credit limits and, for example, other information such as telephone directories, medical information and any other information.

IC cards are considered to be more secure and versatile than the standard embossed plastic credit cards, which employ a magnetic stripe for the storage of data. Virtually all data cards in the past have had an electrical connector which mates a connector with a reader/programmer unit. The reader/programmer unit supplies the card with power and communicates with the card's internal circuitry through electrical connector. The electrical connector on the card is subject to wear due to the frictional contact that must be maintained with the connector in the reader/programmer. As the card is used for a period of time, dirt or grit deposits on the connector terminals make any electrical connection sporadic or ineffective, rendering the card unusable.

One problem that arises if metallic contacts are used, however, is increased ohmic resistance due to the oxidation that takes place over time on the contact surfaces. This is of concern since the accuracy of the data transfer between the card and a Read/Write device decreases as the ohmic resistance of these contacts increases. In addition, the contacts while in the exposed position allow air-borne particles to deposit on the surfaces, decreasing the contact area and causing intermittent connection. Inasmuch as operating power for reading and writing onto a card is also transferred from an associated station in the system to the card via these contacts, there is a loss in the amount of energy transferred after some time, rendering the card inoperative.

A second problem associated with the use of a direct contact device for data transfer to the smart cards is the possibility of electrostatic discharge (ESD) occurring which can damage the microelectronics on the card. High voltages that build up on a person or card that are inadvertently coupled thereto from other sources may very easily be coupled directly to the electronics on the card when metallic contacts are used. Clamping diodes employed at the various inputs of a card provide some measure of protection but are not capable of protecting against some of the high voltage levels a card might occasionally encounter during normal use in its expected environment.

The terminals may also take the form of optical data transmission and reception devices. Optical type terminals may also be susceptible to conducting static electrical discharges onto the storage module. Also, the radiation transmission and reception device such as a lens, must be maintained for radiation absorbing contaminants, such as dirt and grease.

Due to the requirement of previous data storage modules, that the data coupling terminals be in physical contact or otherwise physically accessible to the system's mating terminals, the exposure of the terminals on a surface of the data storage module can result in an overall degradation of the operation of the module or even the complete failure of the module to reliably store data. This problem is especially acute in relatively small data storage cards, which by definition, may be inserted and removed a number of times from a system. Such cards may also be especially vulnerable in that they are typically carried about in a jacket or shirt pocket where the danger of exposure to static discharge is increased.

Another problem is that most data cards have a fragile construction which is inadequate to protect the internal microelectronics during long term use. Should the data card become exposed to temperature extremes of hostile environments, the data could be damaged or lost. If this card contains a patient's medical records, such data loss could be catastrophic. Moreover, when the data cards are plugged in or removed from a reader/programmer, electrical sparks can result, which limits their use to environments that are free of flammable or explosive gases.

A final problem with previous IC or smart cards is with respect to those powered by batteries and having moving parts. This causes the problem of the user needing to know when the battery was low and how to change the battery. The problem with the moving parts was that moving parts tended to wear out and to render the card inoperative at inopportune times.

SUMMARY OF THE INVENTION

The present invention disclosed and claimed herein comprises an IC card system. An IC card is provided that comprises a rigid substrate and electrical components disposed on the substrate. A coil is provided about the periphery of the substrate and is placed in a coil form. Card capacitive plates are disposed on the bottom of the substrate. Power circuitry is provided for receiving inductive power from the coil and generating a regulated power supply voltage for powering the electrical components. I/O circuitry is provided for capacitively coupling data via the card capacitor plates. A cover is also provided for covering the electric components on the substrate. An IC card Read/Write unit is also provided. The IC card Read/Write unit comprises a receptacle shaped similar to the substrate of the IC card. A Read/Write unit coil is provided disposed on the lateral sides of the receptacle, such that the Read/Write unit coil is proximate to the card coil when the card is disposed within the receptacle. Driving circuitry is also provided for driving the Read/Write unit coil to provide inductive power to the card. Read/Write unit capacitor plates are provided and disposed such that when the card is disposed within the receptacle, the card capacitor plates are proximate to the Read/Write unit capacitor plates. Read/Write circuitry is also provided for capacitively coupling data via the Read/Write unit capacitor plates. The IC card may be programmed for data protocols and access codes so that different data protocols may be used to input data and the data may be protected using a personal identification number (PIN).

In another aspect of the present invention, timing information is transferred to the IC card by the inductive coils used to transfer power. A phase locked loop (PLL) circuit is used to lock onto the timing signal. The frequency transferred by the inductive coils is lower than the PLL output.

BRIEF DESCRIPTION OF THE DRAWINGS

For a more complete understanding of the present invention and the advantages thereof, reference is now made to the following description taken in conjunction with the accompanying Drawings in which:

FIG. 2a illustrates a view of the underneath side of the IC card of the present invention;

FIG. 2b illustrates a top view of the IC card of the present invention;

FIG. 2c illustrates the Read/Write unit of the system of the present invention;

FIG. 2d illustrates the receptacle for an alternate method for removing the IC card from the Read/Write unit receptacle;

FIG. 2e illustrates an alternate method for removing the IC card from the Read/Write unit;

FIG. 3a illustrates a view of the underneath side of the alternate embodiment of the system of the present invention;

FIG. 3b illustrates a top view of the alternate embodiment of the system of the present invention;

FIG. 3c illustrates the Read/Write unit of the system of the alternate embodiment of the present invention;

FIG. 3d illustrates the receptacle for an alternate method for removing the IC card from the Read/Write unit receptacle;

FIG. 3e illustrates an alternate method for removing the IC card from the Read/Write unit receptacle;

DETAILED DESCRIPTION OF THE INVENTION

Figure 1:
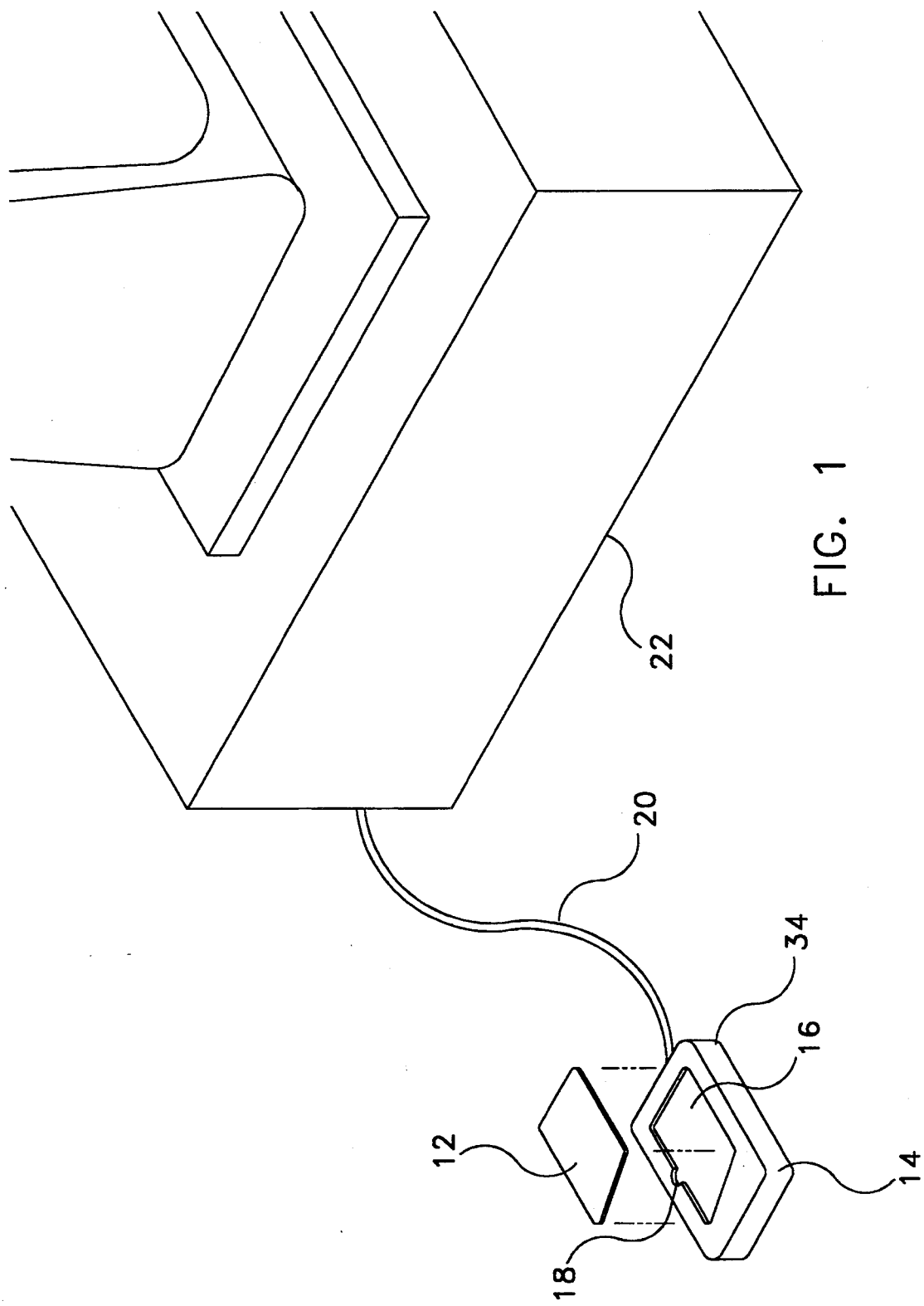
FIG. 1 illustrates a perspective view of the system of the present invention.

Referring now to FIG. 1, there is illustrated a perspective view of the system of the present invention. An IC card 12 is provided, which is trapezoidal in shape. A Read/Write unit 14 is also provided. The Read/Write unit 14 consists of a housing 34 that contains a receptacle 16. The receptacle 16 is of substantially the same shape as the IC card 12, except that the receptacle 16 has a finger notch 18 connected therewith for inserting one finger to remove the IC card 12. The purpose of the trapezoidal shape of the IC card 12 and the receptacle 16 is to provide "keyed" insertion so that the card may only be inserted one way, thus properly aligning the IC card 12. The Read/Write unit 14 is connected to a Central Processing Unit (CPU) 22 by means of a communications interface 20. In operation, the IC card 12 is placed in the receptacle 16 of the Read/Write unit 14. Data can then be transferred to the IC card 12 and stored therein during a Write operation, or extracted from the IC card 12 during a Read operation, the Read and Write operations controlled by the CPU 22 through the Communications interface 20.

Referring now to FIG. 2a, there is illustrated a view of the underneath side of the IC card 12. The IC Card 12 is formed in the shape of a trapezoid. A card capacitive plate 24 and a card capacitive plate 26 are provided. The card capacitive plate 24 is shown separated from the card capacitive plate 26 by an insulating material 28. The card capacitive plates 24 and 26 and the insulating material 28 are all covered by a layer of kapton (not shown) laminated over the bottom of the IC card 12 to provide an overall protective layer, essentially encapsulating the capacitive plates 24 and 26.

Referring now to FIG. 2b, there is shown a top side of IC card 12. The top side of IC card 12 is enclosed in a molded cover 30. Disposed beneath the molded cover 30 is a card coil 32 consisting of multiple windings of wire around the periphery of IC card 12.

Referring now to FIG. 2c, there is illustrated the Read/Write unit 14. Disposed inside the housing 34 of the Read/Write unit 14 and around the periphery of the receptacle 16 is a Read/Write unit coil 36. The Read/Write unit coil 36 is similar to the card coil 32, except that it is disposed in the Read/Write unit 14 around the periphery of the receptacle 16 of the Read/Write unit. Also provided is a first Read/Write unit capacitive plate 38 and a second Read/Write unit capacitive plate 40. These capacitive plates 38 and 40 are disposed underneath the housing 34 of the Read/Write unit 14 in a position such that they are underneath and proximate to the bottom of the receptacle 16. The capacitive plate 38 is separated from the capacitive plate 40 by a region of insulating material 42. Also provided is the communications interface 20 which is connected to the Read/Write unit 14 and can also be connected to a personal computer (not shown).

Referring now to FIG. 2d, there is illustrated a receptacle for an alternate method for removing the IC card from the Read/Write unit receptacle. The Read/Write unit 14 is illustrated, as is the receptacle 16. A depression 19 is provided in the bottom of the Read/Write unit receptacle 16.

Referring now to FIG. 2e, there is illustrated the alternate method for removing the IC card from the Read/Write unit. The Read/Write unit 14, the IC card 12, and the Read/Write unit receptacle 16 are illustrated. The depression 19 in the bottom of the receptacle 16 is also illustrated. In operation, pressure is applied to the IC card 12 directly above the depression 19. The IC card 12 flips out of the Read/Write unit receptacle 16. In this manner, the IC card 12 may be easily removed from the Read/Write unit receptacle 16, without the use of a finger notch 18 as shown in FIG. 3c.

Referring now to FIG. 3a, there is illustrated a view of the underneath side of an alternate embodiment of the IC card 12, a circular IC card 52. A circle is the smallest physical configuration for the design. The IC card 52 is formed in the shape of a disk that has a diameter less than the maximum dimension of a conventional credit card. A first card capacitive plate 62 is provided and a second card capacitive plate 64 is provided. The capacitive plate 62 is shown separated from the capacitive plate 64 by a region of insulating material 66. The capacitive plates 62 and 64 and an insulating material 66 are all covered by a layer of kapton (not shown) laminated over the bottom of the IC card 52. Referring now to FIG. 3b, there is shown a top side of IC card 52. The top side of IC card 52 is enclosed in a molded cover 68. Disposed beneath the molded cover 68 and proximate to the periphery of the IC card 52 is a card coil 70 consisting of multiple windings of wire around the periphery of card 52.

The capacitive plate 64 is disposed in the center of the IC card 52 and is diskshaped with the radial center of the capacitive plate 64 coincident with the radial center of the IC card 52. The capacitive plate 62 is a concentric ring disposed about and spaced apart from the capacitive plate 64 and having the radial center thereof coincident with the radial center of the IC card 52.

Referring now to FIG. 3c, there is illustrated an alternate embodiment of the Read/Write unit 54. The Read/Write unit 54 consists of a housing 72. Disposed in the housing 72 is a receptacle 56. The receptacle 56 is of substantially the same shape as the IC card 52. The receptacle 56 contains a finger notch 58 for inserting one finger to remove the IC card 52. Disposed inside the housing 72 of the Read/Write unit 54 and around and proximate to the periphery of the receptacle 56 is a Read/Write unit coil 74. The Read/Write unit coil 74 is similar to the card coil 70, except that it is disposed in the Read/Write unit 54 around the periphery of the receptacle 56 of the Read/Write unit 52. Also provided is a first Read/Write unit capacitive plate 76 and a second Read/Write unit capacitive plate 78. These capacitive plates 76 and 78 are disposed within the housing 72 of the Read/Write unit 54 in a position such that they are proximate to the bottom surface of the receptacle 56. The capacitive plate 76 is shaped similar to the capacitive plate 62 and separated from the capacitive plate 78 by a region of insulating material 80, the capacitive plate 78 shaped similar to the capacitive plate 64. Also provided is a communications interface 60 which is connected to the Read/Write unit 54 and can also be connected to a personal computer (not shown).

When the IC card 52 is disposed within the receptacle 56, the radial center of the IC card 52 will be substantially coincident with the radial center of the receptacle 56. The diameter of the receptacle 56 is slightly larger than the diameter of the IC card 52 to allow for manufacturing tolerances, expansion due to temperature fluctuations, etc. However, since the capacitive plates 62 and 64 are circular, rotation of the card will not cause any alignment problems which could potentially decouple the capacitive plates 62 and 64 from the capacitive plates 76 and 78, i.e., reduce the capacitive coupling. As long the IC card 52 is inserted right-side up, the rotational orientation does not matter.

Referring now to FIG. 3d, there is illustrated a receptacle for an alternate method for removing the IC card from the Read/Write unit receptacle. The Read/Write unit 54 is illustrated, as is the receptacle 56. A depression 59 is provided in the bottom of the Read/Write unit receptacle 56.

Referring now to FIG. 3e, there is illustrated the alternate method for removing the IC card from the Read/Write unit. The Read/Write unit 54, the IC card 52, and the Read/Write unit receptacle 56 are illustrated. The depression 59 in the bottom of the receptacle 56 is also illustrated. In operation, pressure is applied to the IC card 52 directly above the depression 59. The IC card 52 flips out of the Read/Write unit receptacle 56. In this manner, the IC card 52 may be easily removed from the Read/Write unit receptacle 56, without the use of a finger notch 58 as shown in FIG. 3c.

Figure 4:
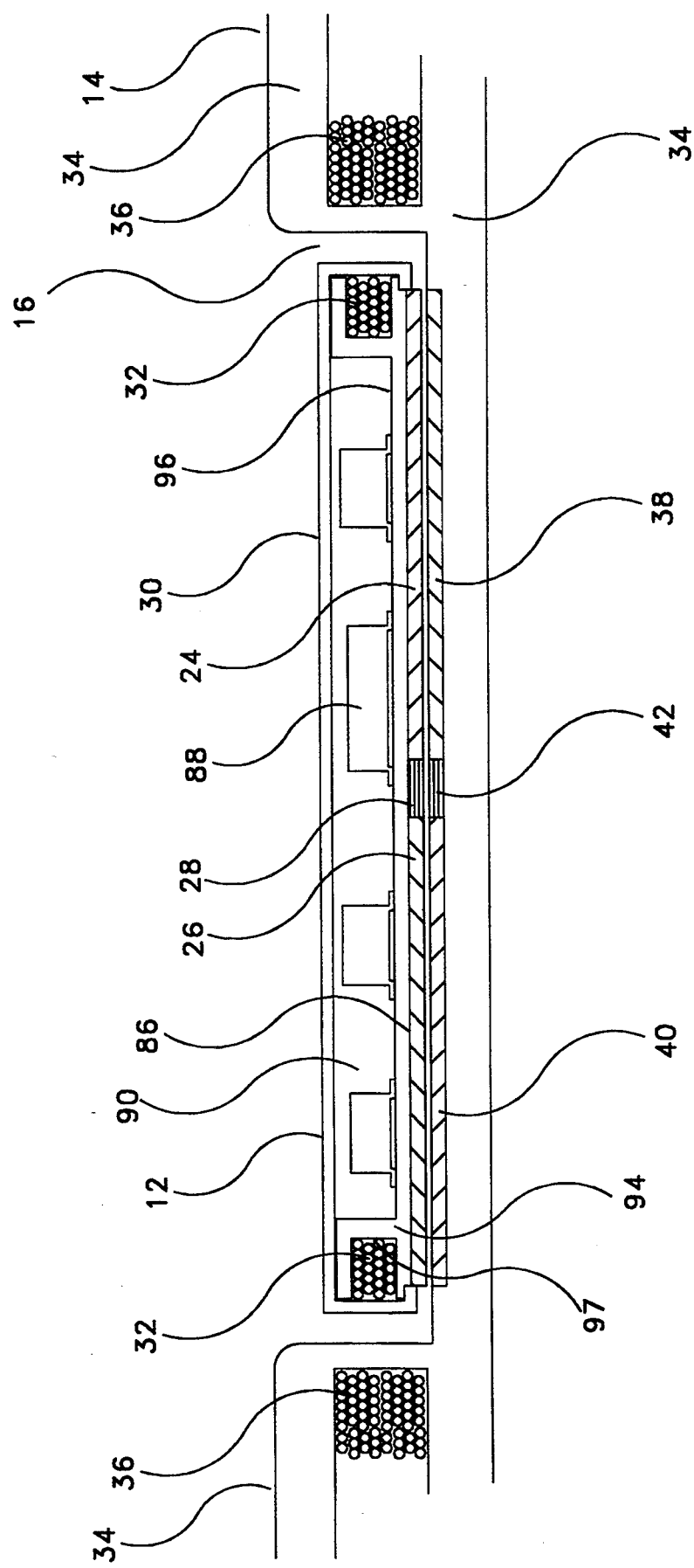
FIG. 4 illustrates a side cross-sectional view of the IC card of the present invention while placed in the receptacle of the Read/Write unit.

Referring now to FIG. 4, there is illustrated a cross-sectional view of the IC card 52 of the preferred embodiment installed in the receptacle 16 of the Read/Write unit 14. The card is generally comprised of a substrate 86 that has a flat planar mounting portion with a coil mounting form 94 disposed around the periphery thereof and integral therewith. The capacitive plates 26 and 24 are disposed with the lower surface thereof and are manufactured from materials such as titanium or any rigid conductive material. In general, the capacitive plates 26 and 24 are operable to form a fairly rigid superstructure for the entire card. Typically, the substrate 86 is plated on both sides with the lower side thereof patterned similar to the shape of the capacitive plates 26 and 24. The capacitive plates 26 and 24 will then be adhered to the patterned areas via conventional techniques, such as solder.

The upper surface of the substrate 86 is then patterned to form the electrical circuit pattern. Typically, a ground plane can be interspersed between the various electrical leaves and interconnections or, alternatively, a multi-layer substrate can be utilized wherein a ground plane is embedded within the substrate 86, such that the circuit pattern on the upper side of the substrate 86 is separated from the capacitive plates 24 and 26.

After forming the pattern, various surface mount components 88 in the form of both integrated circuits and capacitive elements are mounted onto the pattern, the pattern defined by electrical leaves 96.

The coil form 94 is a "U" shaped structure in cross-section with a vertically rising wall that rises upward from the substrate 86 and a horizontal wall extending outward therefrom on both the plane of the substrate 86 and above the substrate 86, such that an opening is provided on the peripheral edge of the substrate 86. This provides a cavity 97 within the coil form 94. This cavity is utilized to wind the coil 32, which is comprised of multiple windings of approximately 28 gauge coil wire. This is typically hand wound or machine wound onto the form and contained therein. Although the coil form 94 is illustrated as being integral with the substrate 86, it should be understood that a separate coil form could be plotted that could be attached to the substrate 86 at a later time. This may be a desirable alternative in that the coil form can then be made independent of the substrate 86 and from a different material to account for various thermal coil coefficients of expansion, or other parameters to materials.

After the coil form 94 has been wound and the electrical components 88 have been disposed on the substrate 86, the substrate 86 is then tested. Once tested, the cover 30 is then disposed over the substrate 86 covering both the coil forms and the upper surface of the components 88. Additionally, the interior, represented by reference number 90, can be filled with some type of potting compound, such as an epoxy. This is primarily utilized to remove heat from the components and/or minimize vibrations that could damage the pans and the various interconnections.

Figure 5:
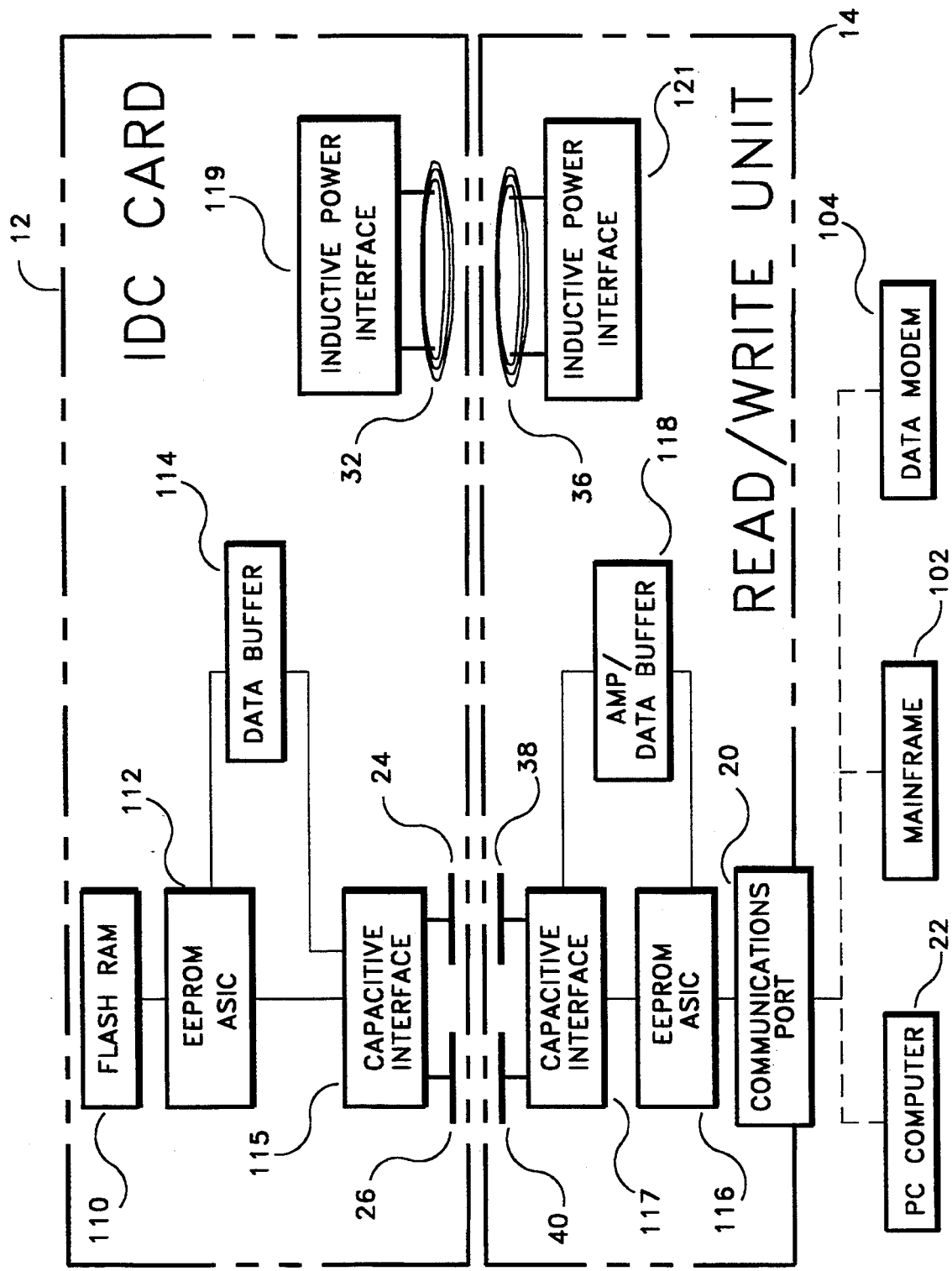
FIG. 5 illustrates a block diagram of the IC card system of the present invention.

Referring now to FIG. 5, there is illustrated a block diagram of the IC card system. The elements of the data IC card 12 are shown, as are the elements of the Read/Write unit 14. The CPU 22, as well as a main frame computer 102 or a data modem 104, can be connected to the Read/Write unit 14 by way of the communications interface 20. In general, the CPU 22, main frame computer 102, or data modem 104 may be any data processing device operable for executing an application program, such as a computer operable for executing a program used to store and retrieve medical records. The application's environment is operable for transmitting data to and receiving data from the application's CPU 22. The IC card 12 includes a FLASH RAM 110 which provides the main Read/Write memory in the IC card for storing data, this being non-volatile data storage. The FLASH RAM 110 is connected to an electronically erasable, programmable read-only memory (EEPROM/ASIC) combination 112 which is operable to emulate the functionality of the card 12. The EEPROM/ASIC 112 contains all the combinatorial logic necessary to effect the card operation for reading and writing through a capacitive interface 115 and communicating with the Read/Write unit 14. A data amplifier/buffer 114 is also provided and is connected to the EEPROM/ASIC 112. The capacitive interface 115 is operable to interface with the capacitive plates 24 and 26 and the data buffer/amplifier 114 and the EEPROM/ASIC 112. Also provided as pan of the IC card 12 is the inductive power interface 119 which interfaces with the inductive card coil 32.

Provided as part of the Read/Write unit 14 is an EEPROM/ASIC 116 substantially similar to the EEPROM/ASIC 112 above. The EEPROM/ASIC 116 is connected to the communications interface 20 of the Read/Write unit 14. A data amplifier/buffer 118 is also provided as part of the Read/Write unit 14. The data amplifier/buffer 118 is connected to the EEPROM/ASIC 116. Also provided as part of the Read/Write unit 14 is a capacitive interface 117 for interfacing between the EEPROM/ASIC 116 and data buffer 118 and two capacitive plates 38 and 40. Also provided as part of the Read/Write unit 114 is an inductive power interface 121 for interfacing with the inductive power transmitter coil 36.

In operation, the IC card 12 interfaces with the Read/Write unit 14 for reading and modifying the data carried in the FLASH RAM 110 of the IC card 12. The power for the card electronics and the actual transmission of data are provided without any direct physical connection between the circuitry of the IC card 12 and the Read/Write unit 14. Power for the IC card 12 is provided by the inductive power interface 121 which consists of a high frequency power supply which has the inductive coil 36 as its output, which is driven by a high frequency oscillator in the Read/Write unit 14. Power is received by the inductive power interface 119 via card coil 32 which is part of the IC card 12. When the card coil 32 is properly aligned with the Read/Write unit coil 36 and the Read/Write unit coil 36 is energized, a current is induced in the card coil 32 and a regulated voltage is supplied to all of the electronic components 88 of the card. When the IC card 12 is inserted into the Read/Write unit 14, the card coil 32 and the Read/Write unit coil 36 are automatically aligned, as are the card capacitive plates 26 and 24 and the Read/Write unit capacitive plates 40 and 38. Transfer of data between the IC card 12 and the Read/Write unit 14 is accomplished by the capacitive plates 38 and 40 and 24 and 26. Data reception to and data transmission from the IC card 12 are provided by the capacitive plates 26 and 24 and 38 and 40, which are formed when the capacitive plate 24 is mated with capacitive plate 38 and capacitive plate 26 is mated with capacitor plate 40.

By employing an EEPROM/ASIC 112 that contains non-volatile memory in IC card 12, a user has the ability to reprogram certain sections of the card while at an authorized associated application station and also download new and different data to the FLASH RAM 110 as desired. Instructions may be downloaded to the EEPROM/ASIC 112 while operating power is being applied for the purpose of reprogramming the IC card 12. When operating power is removed, any changes made to the instruction set in the EEPROM/ASIC 112 remain.

In operation, the IC card 12 is first placed in the Read/Write unit 14 by the user. The card coil 32 receives power from the Read/Write unit coil 36, which may be continually energized. This power is used to power the electronic components 88 of the IC card 12. Data can then be input to the communications interface 20 by the host CPU 22. The data is temporarily stored in the data buffer 118 and then transmitted through the capacitive interfaces 115 and 117 to the IC card 12. The data then moves through the data buffer 114 of the IC card 12 and is stored in the FLASH RAM 110. Data may also be retrieved from the IC card 12 in the same manner, it being noted that a Read operation is non-destructive to the data in the FLASH RAM 110. When a Read operation occurs, data is moved from its stored position in the FLASH RAM 110 of the IC card 12 through the capacitive interface 115 of the IC card 12, through the capacitive plate combinations 26/40 and 24/38, through the capacitive interface 117 of the Read/Write unit 14, and through the data amplifier/buffer 118. The data then moves through the communications interface 20 of the Read/Write unit 14 and may be read by the CPU 22, mainframe 102 or data modem 104.

Figure 6:
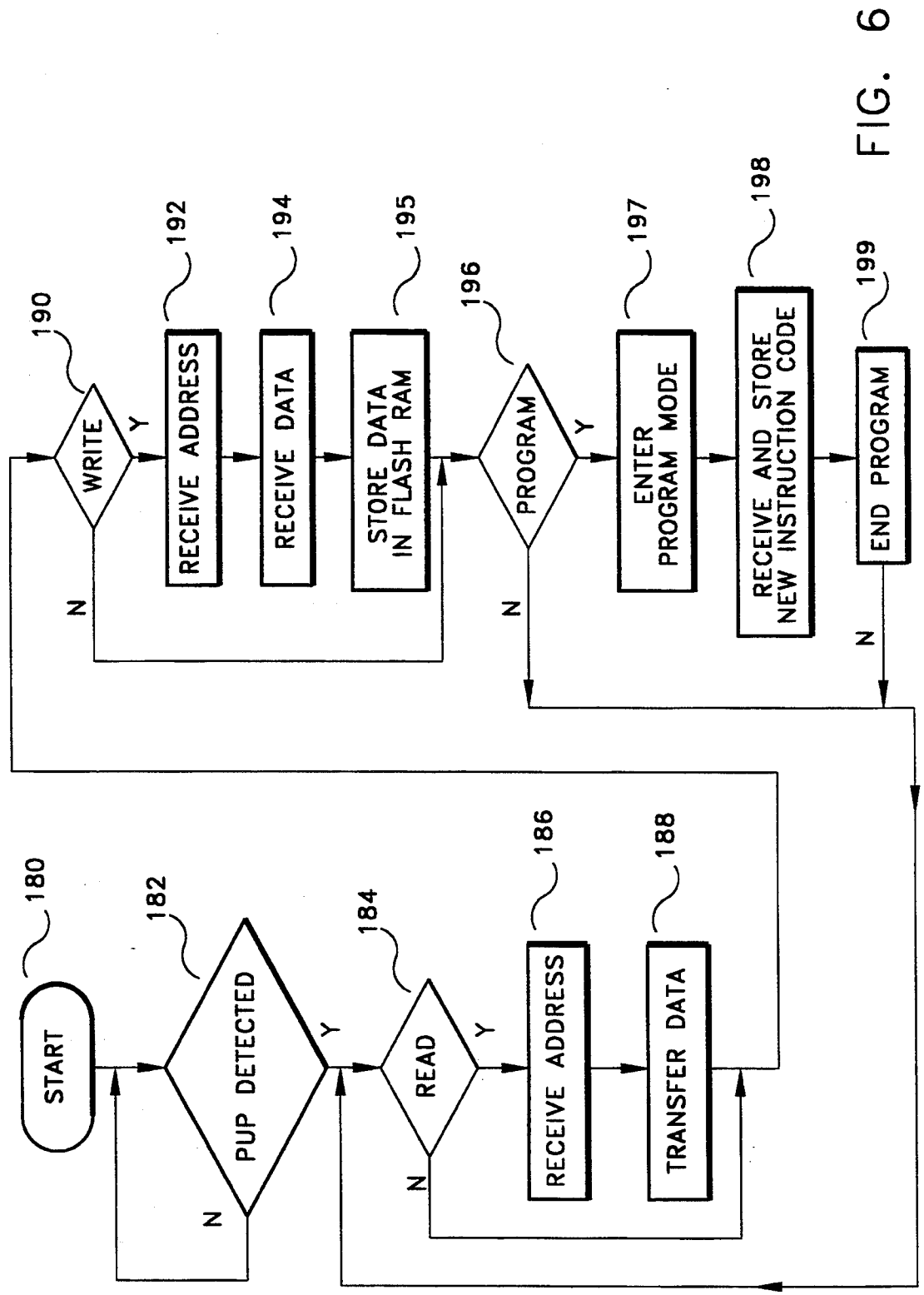
FIG. 6 illustrates a flow chart of the operation of the IC card.

Referring now to FIG. 6, there is illustrated a flow chart depicting the operation of the IC card 12. The program is initiated at a startup block 180 and then proceeds to a decision block 182 to determine if a power up (PUP) operation has been detected. This essentially occurs whenever all circuits are initialized. During a power up operation, the EEPROM/ASIC 112 will initiate a set of instructions and load the various registers to begin operations. This essentially occurs whenever power is applied via the inductive interfaces 119 and 121. The program then proceeds to a decision block 184 to determine if a Read operation is to be performed. If so, the program flows along the "Y" path to a function block 186 to receive the Read address information for addressing the FLASH RAM 110 and then data is received and transferred to the addressed storage locations in the FLASH RAM 110, as indicated by a function block 188. The program then flows to a decision block 190. If a Read operation is not to be performed, the program will flow from the decision block 184 along the "N" path to the input of decision block 190. A Read or a Write operation is determined typically by a Read command that, when high indicates a Read operation and when low, indicates a Write operation.

The decision block 190 determines whether a Write operation is to be performed. If a Write operation is to be performed, the program flows from the decision block 190 along the "Y" path to a function block 192 to receive the address and then to function block 194 to receive data. The data is first stored in the data buffer 114 and then transferred to the FLASH RAM 110 for storage therein at the address location. The EEPROM/ASIC 112 is operable to control the Write operation to FLASH RAM 110 by generating the appropriate Write control signals and timing sequence for the address and data signal. As is well known with RAM devices, the address and data operations are multiplexed such that an address is first applied to the address pin in the form of an eight-bit address, which address is then internally latched into the FLASH RAM 110. This is followed by the application of data which is then stored at the addressed location. For each storage location, i.e., each data word and address must be applied followed by a data word. Of course, the FLASH RAM 110 could be operated in a page mode wherein an initial address could be placed into FLASH RAM 110 followed by incrementing of an address, such that a page of information can be input. Various common Address Strobes and Row Address Strobes signals are generated by the EEPROM/ASIC 112 for controlling the overall Read or Write operations.

The IC card 12 has the ability to control data access via the programming of EEPROM/ASIC 112. A personal identification number (PIN) may be programmed into the EEPROM/ASIC 112. This number then must be used as part of the protocol to change data stored in the IC card 12. The PIN must be inserted into the data stream for the data to be accepted by the IC card 12.

Once data is stored in the Flash RAM, as indicated by function block 195, the program flows to a decision block 196, the program also flowing to the decision block 196 if the decision block 196 indicates that a Write operation is not to be performed. The decision block 196 determines whether the program function has been selected, such that the EEPROM portion of the EEPROM/ASIC 112 is to be programmed to provide new instructions therefor. So, the program flows along the "Y" path to a function block 197 to enter the program mode, wherein the EEPROM portion of EEPROM/ASIC 112 is placed into an electrically programmable mode. Data is then received and stored in the form of instructions within the EEPROM, as indicated by a function block 198 and then the program flows to a function block 199 to end the program mode and then back to the input of decision block 184 to again determine whether a Read, a Write or a Program mode is to be entered. If a Program mode was not selected at decision block 198, the program would also flow back to the input of the Read block 184. Therefore, the flow chart of FIG. 6 illustrates that the IC card 12 is primarily utilized for storing of data therein and extracting of data therefrom.

Figure 7:
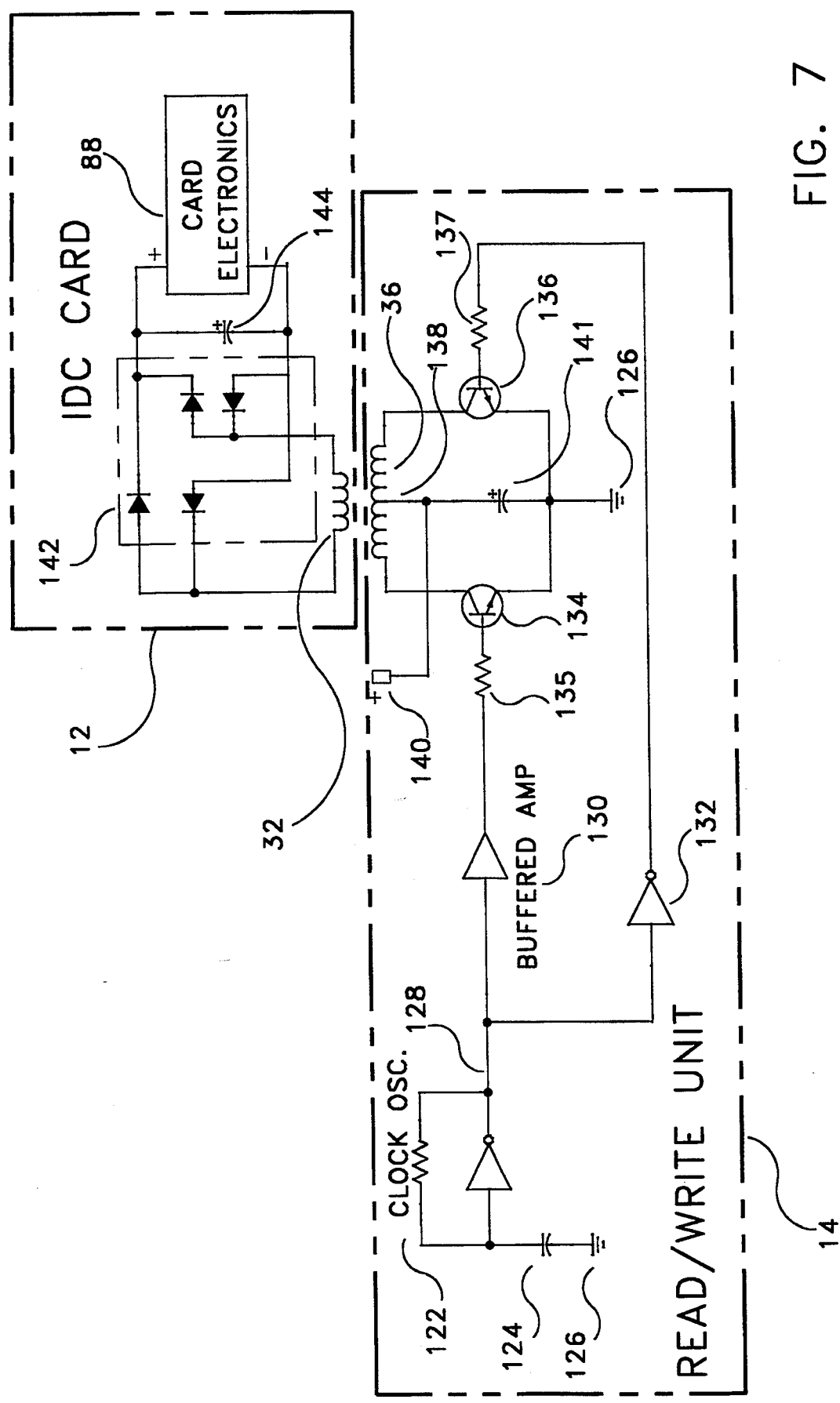
FIG. 7 illustrates a schematic diagram of the power supply circuits of the IC card and the Read/Write unit.

Referring now to FIG. 7, there is illustrated a schematic diagram of the power supply circuits of the IC card, and the Read/Write unit. A clock oscillator 122 on the Read/Write unit 14 is provided. The input of the clock oscillator 122 is connected to one side of a capacitor 124 and the opposite side of the capacitor 124 is connected to ground node 126. The output of the clock oscillator 122 is connected to a node 128. Node 128 is connected to the output of a buffer amplifier 130 and node 128 is also connected to the input of an inverter 132. The output of amplifier 30 is connected through a resistor 135 to the base of an NPN transistor 134. The output of inverter 132 is connected through a resistor 137 to the base of an NPN transistor 136. The emitters of transistors 134 and 136 are connected to ground node 126. The collector of transistor 134 is connected to one end of the inductive Read/Write unit coil 36 and the collector of transistor 136 is connected to the opposite end of inductive Read/Write unit coil 36. A center tap 138 is provided on the inductive Read/Write unit coil 36, and connected to a power supply node 140. The power supply node 140 is also connected to ground 126 through a capacitor 141.

In operation, oscillator 122 generates an output at node 128. At node 128, the clock signal drives the base of transistor 134 and transistor 136 with a 180° phase relation. The clock signal is then amplified by transistors 134 and 136 of which the collector-emitter paths therethrough are connected between the ground node 126 and opposite ends of the inductive Read/Write unit coil 36. There is also connected between voltage source 140 and ground node 126 a filter capacitor 141. As a result of this connection, as the signal from transistor 134 moves in a positive direction, the amplified signal from transistor 136 moves in a negative direction, such that the output of the collector of each transistor, 134 and 136 is 180° out of phase with the other. As a result, the two transistors 134 and 136 effect an on/off operation at the frequency of the clock oscillator 122 to energize the inductive Read/Write unit coil 36.

Referring further to FIG. 7, a detail of the IC card 12 is illustrated. A full wave rectifier circuit 142 is provided having the inputs of the full wave rectifier thereof connected to each end of the inductive card coil 32, respectively. The two outputs of the full wave rectifier 142 are connected in parallel with a filter capacitor 144. Also connected in parallel across the capacitor 144 and also across the outputs of the full wave rectifier 142 are the card's electrical components 88.

In operation, when the inductive Read/Write coil 36 is energized, a high frequency current is induced in the inductive card coil 32. The output of the inductive card coil 32 is applied to the full wave bridge rectifier 142 to convert the current into a DC current, which is filtered by a capacitor 144. The resulting DC voltage is then applied to the card's electronics 88 with some regulation incorporated.

Figure 8:
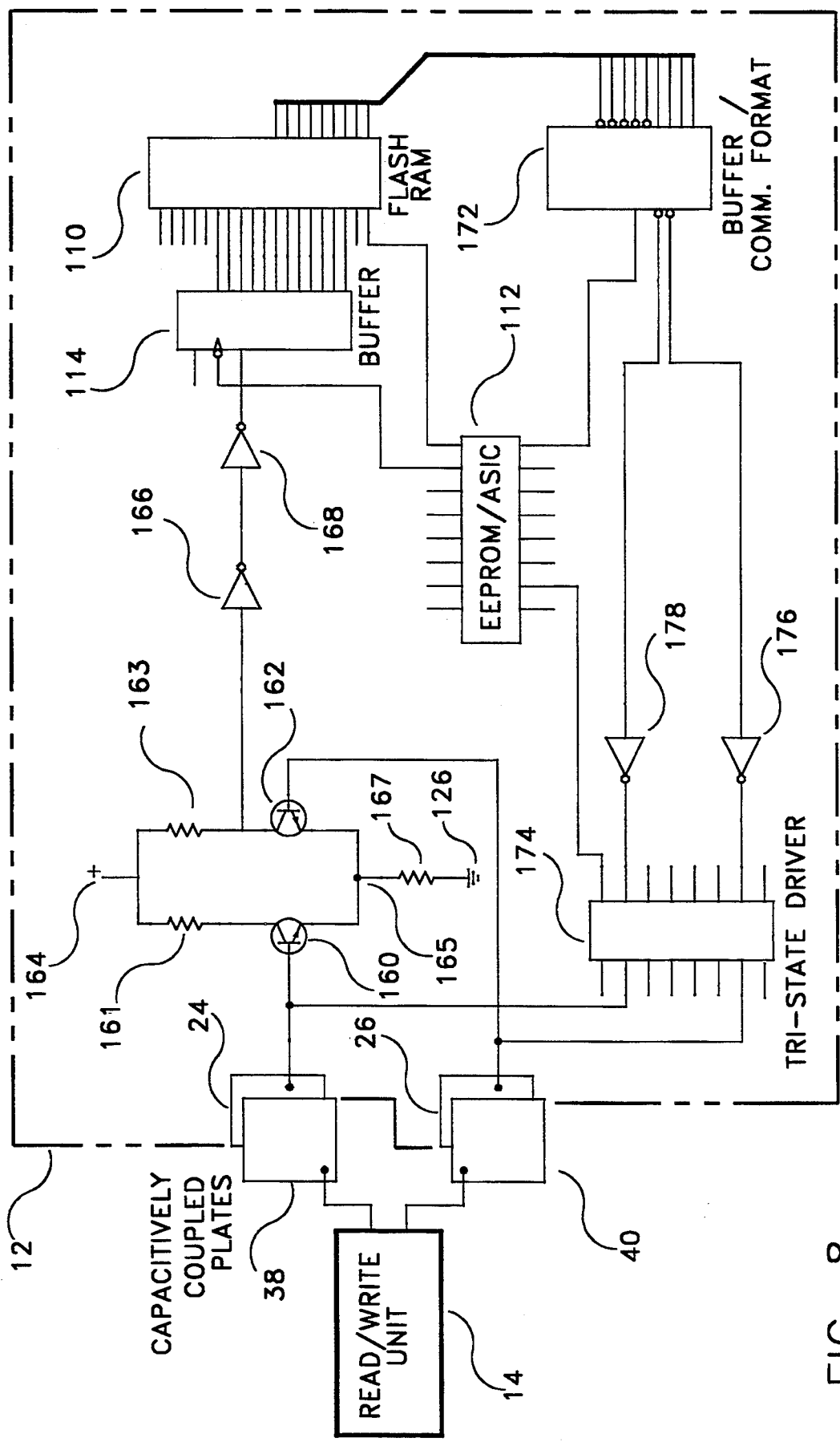
FIG. 8 illustrates a schematic diagram of the data transmitting and receiving circuitry of the IC card of the present invention.

Referring now to FIG. 8, there is illustrated a schematic diagram of the data transmitting and receiving circuitry of IC card 12. The first Read/Write unit capacitive plate 38 is opposed to and capacitively coupled for the first card capacitive plate 24. The second Read/Write unit capacitive plate 40 is opposed to and capacitively coupled with the second card capacitive plate 26. The first card capacitive plate 24 is connected to the base of an NPN transistor 160. The second card capacitive plate 26 is connected to the base of a second NPN transistor 162. The collector of transistor 160 is connected through a resistor 161 to the positive voltage VCC on a power supply node 164 and the collector of transistor 162 is also connected through a resistor 163 to the power supply node 164. The emitter of transistor 160 is connected to a common emitter node 165 with the emitter of transistor 162 and node 165 connected across a resistor 167 to ground node 126. These two transistors 160 and 162 form a differential amplifier, the output of which is at the collector of transistor 162. This output is connected to two series connected inverters 166 and 168. The output of the second inverter 168 is connected to a data buffer 114, which provides a serial-in, parallel out function. The buffer 114 is connected to the address inputs of the FLASH RAM 110. The data output of the FLASH RAM 110 is connected to a buffer 172 that provides the communications interface format. Buffer 172 has two outputs, each of which is connected to the input inverters 176 and 178, respectively. One output of the tri-state driver 174 is connected to the first card capacitor plate 24. The other output of the tri-state driver 174 is connected to the second card capacitor plate 26. A clock IC ASIC 112 containing Read/Write logic in firmware in an EEPROM is also provided. Outputs of the clock Read/Write ASIC 112 are connected to the buffer 114, the FLASH RAM 110, the buffer 172 and the tri-state driver 174.

In operation, the Read/Write unit 14 will provide electrical potentials on the first Read/Write unit capacitive plate 38 and the second Read/Write unit capacitive plate 40. The electrical potential will be coupled resulting in the transfer of a charge from the first Read/Write unit plate 38 to the first card plate 24. The charge from the second Read/Write unit capacitive plate 40 will be coupled resulting in the transfer of a charge to the second card capacitor plate 26. Thus, it can be seen that if the Read/Write unit 14 expresses a time varying electrical potential upon plates 38 and 40, the card capacitor plates 24 and 26 will be expressive of the time varying input signal from the Read/Write unit 14. The signal received through card capacitor plate 24 and card capacitor plate 26 is then transferred to a differential amplifier comprising transistors 160 and 162 which are used in receiving differential data coupled to capacitive plates 24 and 26 from capacitive plates 38 and 40 of the Read/Write unit 14. The output of the transistors 160 and 162 is then fed through two inverters 166 and 168 into the buffer 114. The data is then stored in FLASH RAM 110. The reading and writing of this data stored in FLASH RAM 110 is controlled by the EEPROM ASIC 112. To retrieve the data from the FLASH RAM 110, the EEPROM ASIC 112 initiates a transfer of the data from the FLASH RAM 110 to the buffer 172. The buffer has two differential outputs and each is fed through respective inverter 176 or 178 to the tri-state driver 174. The first differential output is then fed into card capacitive plate 24 and the second differential output is fed into card capacitive plate 26. First card capacitive plate 24, which now has an electrical potential capacitively couples this potential to first Read/Write unit plate 38 and second card capacitive plate 26, which now also have an electrical potential capacitively couples this electrical potential to second Read/Write unit capacitive plate 40. In this way, data is capacitively coupled back and forth from the IC card 12 to the Read/Write unit 14.

Figure 9:
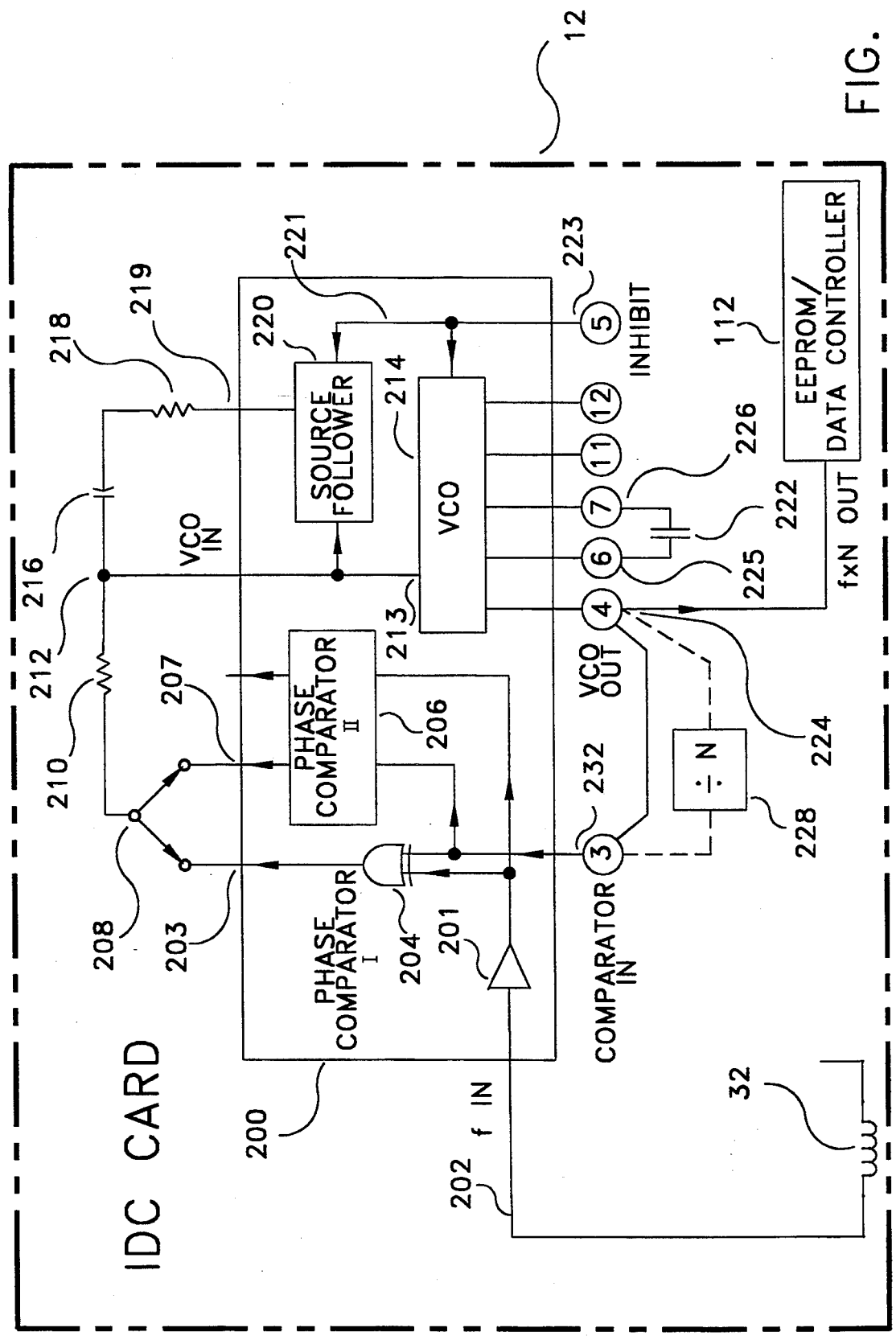
FIG. 9, illustrates an alternate method for providing a clock signal.

Referring now to FIG. 9, there is illustrated an alternate method for providing a clock signal. A phase locked loop (PLL) integrated circuit 200 is provided which is a conventional circuit block, for a commercially available chip. The PLL 200 has an input 202 which is connected to a buffer amplifier 201 and is operable to receive a frequency input $f_{in}$. The output of buffer amplifier 201 is connected to one input of an Exclusive OR phase comparator 204 and also connected to one input of a conventional phase comparator 206. The output of the phase comparator 204 is node 203 and the output of phase comparator 206 is node 207. A switch 208 can be connected to either node 203 or node 207. The output of switch 08 is connected to one side of a resistor 210 to node 212. Node 212 is connected to a input 213 of a voltage controlled oscillator (VCO) 214 that operates at a frequency higher than $f_{in}$. Node 212 is also connected to one side of a capacitor 216 that is disposed in series with a resistor 218 the other side thereof connected to node 219, which is connected to a source follower 220. Node 212 is also connected to the source follower 220. Node 223 is connected to the source follower 220 and the voltage control oscillator 214 as an inhibit input 221. The voltage controlled oscillator 214 has three outputs, two of which, nodes 225 and 226, are connected to opposite ends of capacitor 222. The output of the voltage controlled oscillator 214 is node 224. Node 224 is connected to EEPROM/ASIC 112 and is also connected to the input of a divide-by-N logic circuit 228 which divides the frequency output 224 of the VCO 214 by N. The output of the device 228 is input to node 232 which serves as the second input to phase comparator 204 and phase comparator 206. Node 224 can alternatively be connected directly to pin 3 and node 232.

When, as described above with respect to FIG. 7, the inductive card coil 32 is energized, the signal on line 202 is input as the frequency input to buffer amplifier 201. The output of buffer amplifier 201 can either be input to the Exclusive OR phase comparator 204 or the conventional phase comparator 206. This determination is made by switch 208 with the output of phase comparator 204 being node 203 and the output of the phase comparator 206 being node 207. The phase comparator 204 or 206 compares the phase and frequency of the input signal at node 202 with the output signal 224 of the voltage controlled oscillator 214 and generates an error voltage related to the phase difference between the two signals. This error voltage then passes through resistor 210 and in parallel with capacitor 216 and resistor 218 which act as a low pass filter. The signal is then input into the voltage controlled oscillator 214. This input forces the output 224 of voltage controlled oscillator 214 to vary in a direction which reduces the phase difference between the frequency input at node 202 and the output of the voltage controlled oscillator 214. The output 224 of the voltage controlled oscillator 214 is then input to EEPROM/ASIC 112. The output 224 of voltage controlled oscillator 214 is then divided by N by logic 228 and then input at node 232 into phase comparator 204 or phase comparator 206 to be compared with the input frequency at node 202. Alternatively, the output 224 of the voltage controlled oscillator 214 may be input directly into node 232 by way bypassing logic 228.

A clock signal with a sufficiently high frequency is required to run the system. Using a frequency multiplier enables the device to be used utilizing an accurately controlled lower frequency to transfer the signal to the inductive card coil 32 and thereby generating a higher clock frequency with the same accuracy as the signal frequency.

In summary, there has been provided an IC card system comprising an IC card and a Read/Write unit. Data is capacitively coupled between the IC card and the Read/Write unit. The IC card is powered by transferring power inductively from the Read/Write unit. The IC card uses an EEPROM to store the received data.

Although the preferred embodiment has been described in detail, it should be understood that various changes, substitutions and alterations can be made therein without departing from the spirit and scope of the invention as defined by the appended claims.

What is claimed is:

1. An IC card system, comprising:
    an IC card, having:
    a rigid substrate having a top side, a bottom side and a periphery,
    electrical components disposed on said top side of said substrate,
    a coil form disposed about said periphery of said substrate,
    a card coil wound about said coil form,
    first and a second card capacitive plates disposed on said bottom side of said substrate,
    power circuitry for receiving inductive power from said coil and generating a regulated power supply voltage for powering said electrical components,
    I/O circuitry for capacitively coupling data via said first and second card capacitor plates, and
    a cover for covering said electrical components on said top side of said substrate; and
    an IC card Read/Write unit, having:
    a receptacle shaped similar to said substrate such that said card coil is disposed within said receptacle once said card is disposed within said Read/Write unit,
    a Read/Write unit coil disposed in the lateral sides of said receptacle such that said Read/Write unit coil is proximate to said card coil when said card is disposed within said receptacle of said Read/Write unit,
    driving circuitry for driving said Read/Write unit coil to provide inductive power to said card through said card coil,
    a first and a second Read/Write unit capacitor plate disposed such that when said card is disposed within said receptacle, said first card capacitor plate is proximate to said first Read/Write unit capacitor plate and said second card capacitor plate is proximate to said second Read/Write unit capacitor plate, and
    Read/Write circuitry for capacitively coupling data via said first and second Read/Write unit capacitor plates.

2. The IC card system of claim 1 wherein said IC card has a unique shape corresponding to that of said receptacle of said Read/Write unit.

3. The IC card system of claim 2 wherein said IC card and said receptacle of said Read/Write unit have the shape of a trapezoid.

4. The IC card system of claim 2 wherein said IC card and said receptacle of said Read/Write unit have the shape of a circle.

5. The IC card system of claim 1 wherein said first and second card capacitive plates form rigid portions of said substrate.

6. The IC card system of claim 1 wherein said first and second card capacitive plates are formed by a titanium layer deposited or laminated on the bottom side of said substrate.

7. The IC card system of claim 1 and further comprising a Kapton layer laminated over the bottom of said substrate and said capacitive plates.

8. The IC card system of claim 1 wherein the area around said electrical components between said cover and said substrate is filled with potting compound.

9. The IC card system of claim 1 and further comprising a printed circuit deposited on said substrate.

10. The IC card system of claim 1 wherein said electrical components are low-profile SMD components.

11. The IC card system of claim 1 wherein said cover snaps onto said substrate.

12. The IC card system of claim 3 wherein said first and said second card capacitive plates are formed in the shape of rectangles.

13. The IC card system of claim 4 wherein said first card capacitive plate is formed in the shape of a circle concentric with the substrate and said second card capacitive plate is formed in the shape of a ring, concentric with the first capacitive plate.

14. The IC card system of claim 1 and further comprising a Flash RAM to store said capacitively coupled data.

15. The IC card system of claim 1 wherein said receptacle has a shape that substantially conforms to the shape of said substrate such that minimal clearance between the walls of said receptacle and the peripheral edges of said substrate exist and further comprising a finger notch disposed in the wall of said receptacle to allow access of a user's finger to a portion of the peripheral edge of said substrate for removal thereof.

16. The IC card system of claim 1 wherein said receptacle has a shape that substantially conforms to the shape of said substrate such that minimal clearance between the walls of said receptacle and the peripheral edges of said substrate exist and further comprising a depression in the bottom of said receptacle proximate to the peripheral edge thereof and sized to allow said substrate to be pushed therein and canted upward at the other end thereof and out of said receptacle.

17. The IC card system of claim 1 and further comprising an EEPROM to store data protocols.

18. The IC card system of claim 1 and further comprising an EEPROM to store access codes.

19. The IC card system of claim 1 wherein said electrical components have associated therewith a clock frequency operating at a first frequency and said driving circuitry operates at a second frequency lower than said first frequency and further comprising a clock generator for generating said clock frequency and locking said clock frequency to said second frequency inductively coupled to said card coil by said driving circuitry.

20. The IC card system of claim 19 wherein said clock generator further comprises a phase locked loop (PLL) circuit for locking said clock frequency to said second frequency.

21. A method for reading data from, writing data to and storing data in an IC card, utilizing an external Read/Write unit, comprising the steps of:
    providing a receptacle in the Read/Write unit;
    disposing a Read/Write unit coil about the receptacle;
    disposing two capacitive plates underneath the receptacle;
    disposing a card coil about the periphery of the IC card;
    disposing two capacitive plates in the card;
    generating inductive power from the Read/Write unit coil disposed in the lateral sides of the receptacle in the Read/Write unit;

receiving the inductive power from the Read/Write unit coil through the card coil disposed about the periphery of the IC card when the card is disposed within the receptacle of the Read/Write unit such that the Read/Write unit coil is proximate to the card coil;

generating a regulated power supply voltage for powering electrical components in the IC card; and capacitively coupling data via a first and second card capacitor plates and a first and second Read/Write unit capacitor plates disposed such that when the card is disposed within the receptacle, the first card capacitor plate is proximate to the first Read/Write unit capacitor plate and the second card capacitor plate is proximate to the second Read/Write unit capacitor plate.

22. The method of claim 21 wherein the IC card has a unique shape corresponding to that of the receptacle in the Read/Write unit.

23. The method of claim 21 wherein the IC card and the receptacle in the Read/Write unit have the shape of a trapezoid.

24. The method of claim 21 wherein the IC card and the receptacle in the Read/Write unit have the shape of a circle.

25. The method of claim 24 wherein the first card capacitive plate is formed in the shape of a circle concentric with the substrate and the second card capacitive plate is formed in the shape of a ring, concentric with the first capacitive plate.

26. The method of claim 21 wherein the first and second card capacitive plates form the rigid portions of the IC card.

27. The method of claim 21 wherein the first and second card capacitive plates are formed by a titanium layer deposited or laminated on the bottom of the IC card.

28. The method of claim 21 wherein the first and the second card capacitive plates are formed in the shape of rectangles.

29. The method of claim 21 wherein the IC card further comprises a Flash RAM to store the capacitively coupled data.

* * * * *

UNITED STATES PATENT AND TRADEMARK OFFICE
CERTIFICATE OF CORRECTION

PATENT NO. : 5,451,763

DATED : September 19, 1995

INVENTOR(S) : Pickett et al.

It is certified that error appears in the above-identified patent and that said Letters Patent is hereby corrected as shown below:

Column 7, line 33, delete "pan", and insert therefor --part--;

Column 12, line 3, delete "08", and insert therefor --208--.

Signed and Sealed this

Seventeenth Day of February, 1998

*Attest:*

BRUCE LEHMAN

*Attesting Officer*         Commissioner of Patents and Trademarks